(12) United States Patent
Gaiser et al.

(10) Patent No.: US 6,513,477 B1
(45) Date of Patent: Feb. 4, 2003

(54) CLOSED GALLERY PISTON HAVING PIN BORE LUBRICATION

(75) Inventors: Randall R. Gaiser, Chelsea, MI (US); Carmo Ribeiro, Ann Arbor, MI (US); Eduardo H. Matsuo, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 156 days.

(21) Appl. No.: 09/957,716

(22) Filed: Sep. 19, 2001

(51) Int. Cl.[7] .................................................. F02F 3/00
(52) U.S. Cl. ...................................... 123/193.6; 92/187
(58) Field of Search ........................ 123/193.6; 92/187, 92/188

(56) References Cited

U.S. PATENT DOCUMENTS

| | | | |
|---|---|---|---|
| 4,011,797 A | | 3/1977 | Cornet |
| 4,013,057 A | * | 3/1977 | Guenther .................. 123/193.6 |
| 4,180,027 A | | 12/1979 | Taylor |
| 4,253,430 A | * | 3/1981 | Garter et al. ............. 123/193.6 |
| 4,331,107 A | | 5/1982 | Bruni |
| 4,506,632 A | * | 3/1985 | Kanda et al. ............. 123/193.6 |
| 4,581,983 A | | 4/1986 | Moebus |
| 4,662,319 A | | 5/1987 | Ayoul |
| 4,776,075 A | | 10/1988 | Kawabata et al. |
| 5,052,280 A | | 10/1991 | Kopf et al. |
| 5,115,726 A | * | 5/1992 | Daxer et al. ............. 123/193.6 |
| 5,144,923 A | | 9/1992 | Leites et al. |
| 5,413,074 A | | 5/1995 | Horiuchi |
| 5,483,869 A | | 1/1996 | Bock et al. |
| 5,542,341 A | * | 8/1996 | Monk et al. .................. 92/187 |
| 5,692,430 A | | 12/1997 | McLaughlin et al. |
| 5,778,533 A | | 7/1998 | Kemnitz |
| 5,794,582 A | | 8/1998 | Horiuchi |
| 5,913,960 A | | 6/1999 | Fletcher-Jones |
| 5,934,174 A | | 8/1999 | Abraham, Sr. et al. |
| 5,979,298 A | | 11/1999 | Whitacre |
| 6,003,479 A | | 12/1999 | Evans |
| 6,032,619 A | | 3/2000 | Zhu et al. |
| 6,152,016 A | | 11/2000 | Bahr et al. |
| 6,279,456 B1 | * | 8/2001 | Ueshima et al. ............. 92/187 |

* cited by examiner

Primary Examiner—Marguerite McMahon
(74) Attorney, Agent, or Firm—Reising, Ethington, Barnes, Kisselle, Learman & McCulloch, P.C.

(57) ABSTRACT

A piston for diesel engines includes a piston body formed with a closed oil gallery and a pair of pin bosses having axially aligned pin bores whose surfaces are spaced from one another about their circumference across an intervening gap between the pin bosses. The pin bore surfaces are each formed with a recess which extends in the axial direction of the pin bores across the full width of each of the pin bore surfaces. An oil passage leads from the gallery to each of the recesses and feeds the recesses with lubricating oil from the gallery. The recesses act as retention basins or reservoirs which collect and supply the pin bore surfaces with lubricating oil during the fall cycle of the piston.

8 Claims, 3 Drawing Sheets

CLOSED GALLERY PISTON HAVING PIN BORE LUBRICATION

BACKGROUND OF THE INVENTION

1. Technical Field

This invention relates generally to pistons for diesel engine applications, and more particularly to those having a closed oil gallery.

2. Related Art

It is known in diesel engine applications to provide a piston whose piston body is formed with a closed gallery for cooling oil. The oil circulates through the gallery and cools parts of the piston which are susceptible to damage from the heat of combustion. Such cooling galleries are generally annular or ring-shaped and are provided just inside of the ring belt adjacent the top wall of the piston body. The gallery is bounded by the inner wall and closed at the bottom by a bottom wall. One or more inlets are provided for receiving cooling oil into the gallery. Various outlets are also provided for directing portions of the oil from the gallery into other regions of the piston for cooling or lubrication purposes. It is know to provide an oil passage leading from the cooling gallery to the pin bores of the pin bosses for lubricating the wrist pin. The entry point for the lubrication is rather localized and provides a limited supply of oil for lubrication which may not be present during the entire stroke of the piston.

It is an object of the present invention to improve the lubrication of the pin bore and closed gallery diesel piston applications.

SUMMARY OF THE INVENTION

A piston for diesel engines constructed according to a presently preferred embodiment of the invention includes a piston body having an oil gallery and a pair of pin bosses having pin bores disposed about a common pin bore axis and pin bore surfaces which are spaced from one another about their circumference by an intervening space between the pin bosses. According to the invention, at least one recess is formed in at least one of the pin bore surfaces and extends axially across the at least one pin bore surface. At least one associated oil passage extends from the gallery to the recess for feeding oil from the gallery to the recess.

The invention has the advantage of providing improved lubrication to the pin bosses of diesel engine pistons having closed oil cooling galleries which serves as a reservoir for lubricating oil for the pin bosses.

The invention has the further advantage of providing an axial relief or recess in the pin bore surface which itself acts as a localized oil reservoir for lubricating oil adjacent the pin bore surface. The recess, fed by the oil passage, captures or wicks the oil and then feeds the oil to the pin bore surface during the full stroke of the piston, including at the top of the stroke when less oil is available in the gallery to be fed to the pin bores. At such times, the pocket of oil retained in the pin bore recess is available to feed the pin bore surfaces with lubricating oil.

Another advantage of the invention is that it provides a simple solution for greatly improving the lubrication of the pin bore of closed gallery diesel pistons. The recess may be formed in the pin bore surface by a simple machining operation and could be readily adapted to existing manufacturing processes during the machining of the pin bore surfaces.

The invention has the further advantage of prolonging the life of pistons, connecting rods and wrist pin by improving the lubrication to their interactive surfaces during operation.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
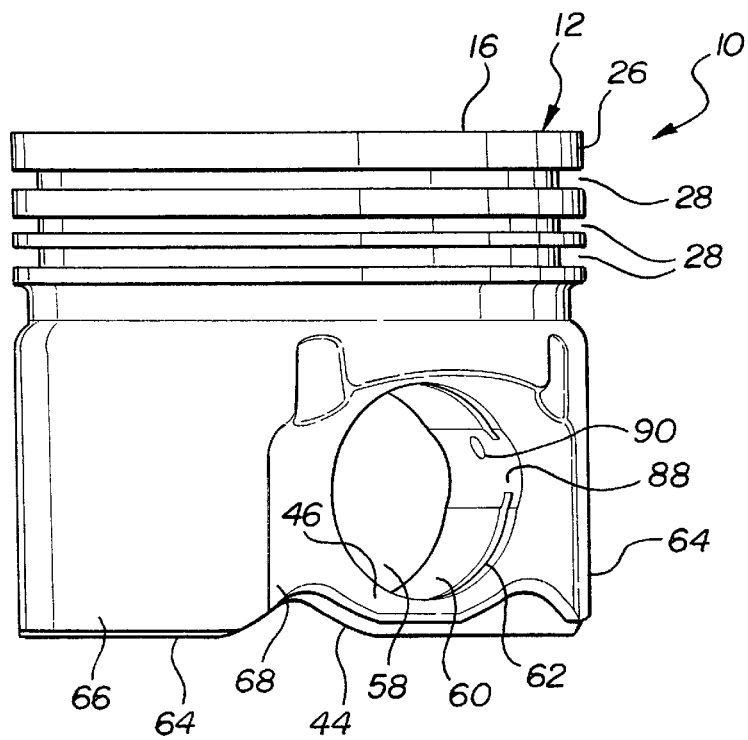
FIG. 1 is an elevational view of a piston constructed according to a presently preferred embodiment of the invention.

A closed gallery piston assembly constructed according to a presently preferred embodiment of the invention is indicated generally at 10 in FIG. 1 and comprises a piston body 12 having an annular top wall 14 with an upper surface 16. A combustion crater or bowl 18 extends into the top wall 14 from the upper surface 16. The top wall 14 has a lower or underside surface 22 opposite the upper surface 16.

The piston body 12 has an outer wall or ring belt 24 that is annular and extends downwardly from the top wall 14. The outer wall 24 has an outer annular peripheral surface 26 formed with a plurality of ring grooves 28. The outer wall 24 includes an inner annular surface 30 spaced radially inwardly from the outer surface 26.

The piston body 12 includes an inner wall 32 projecting downwardly from the combustion bowl 18 and having a radially outwardly facing surface 34 spaced radially inwardly from the inner surface 30 of the outer wall 24.

The piston body 12 has an annular bottom wall 36 which is spaced from the top wall 14 and extends between and interconnects the outer wall 24 and inner wall 32 adjacent their lower ends. The bottom wall 36 has an upper floor surface 38 and lower surface 40.

Figure 2:
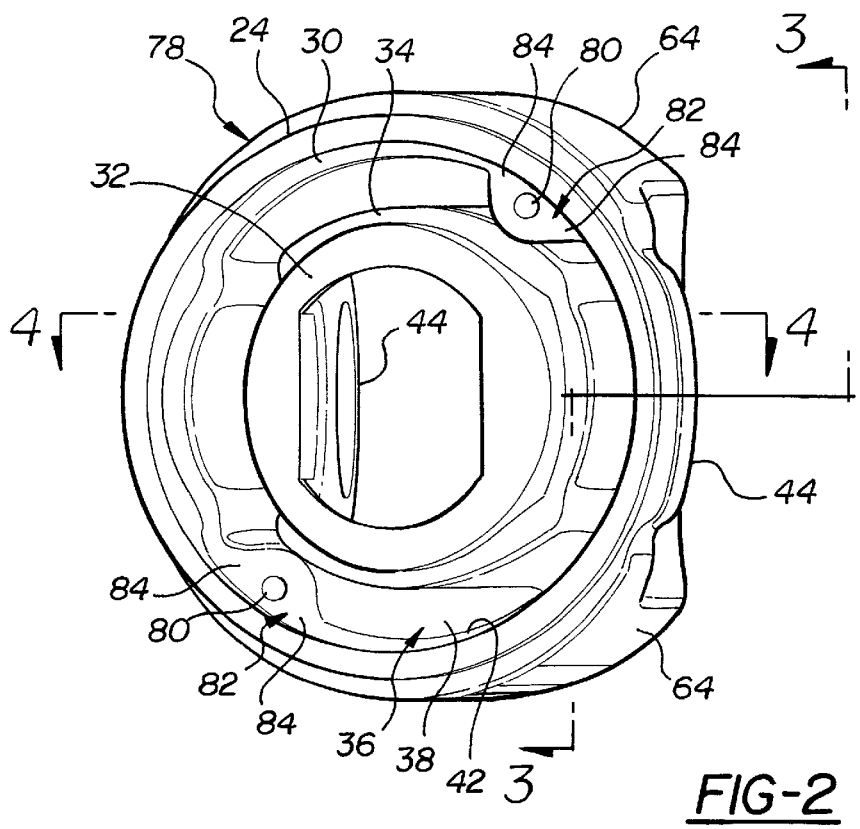
FIG. 2 is a cross-sectional plan view taken along lines 2–2 of FIG. 1.
Figure 3:
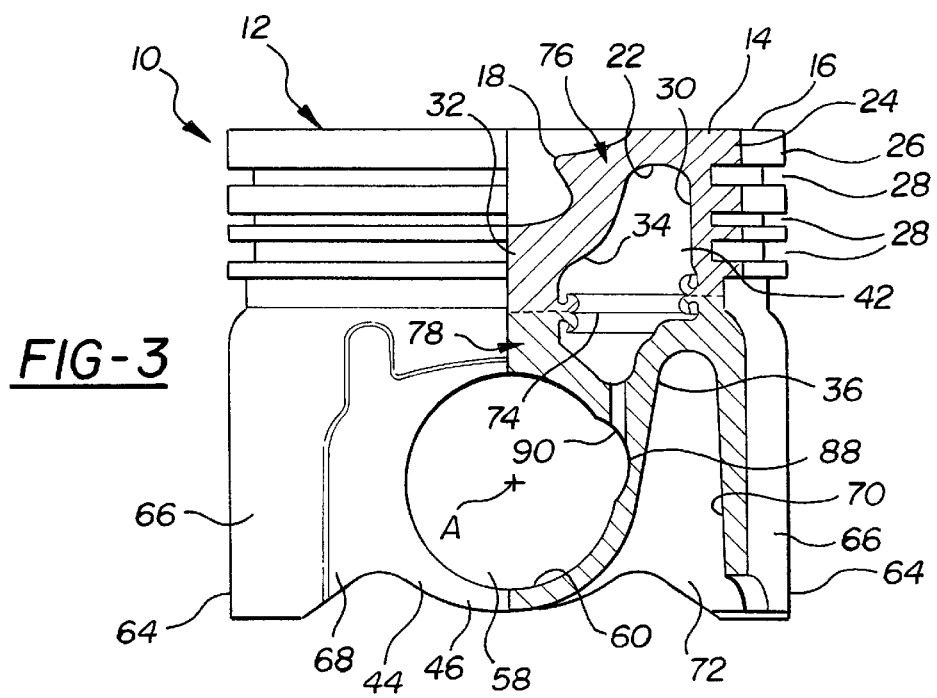
FIG. 3 is a partially sectioned plan view taken generally along lines 3–3 of FIG. 2, but of the entire piston assembly.
Figure 4:
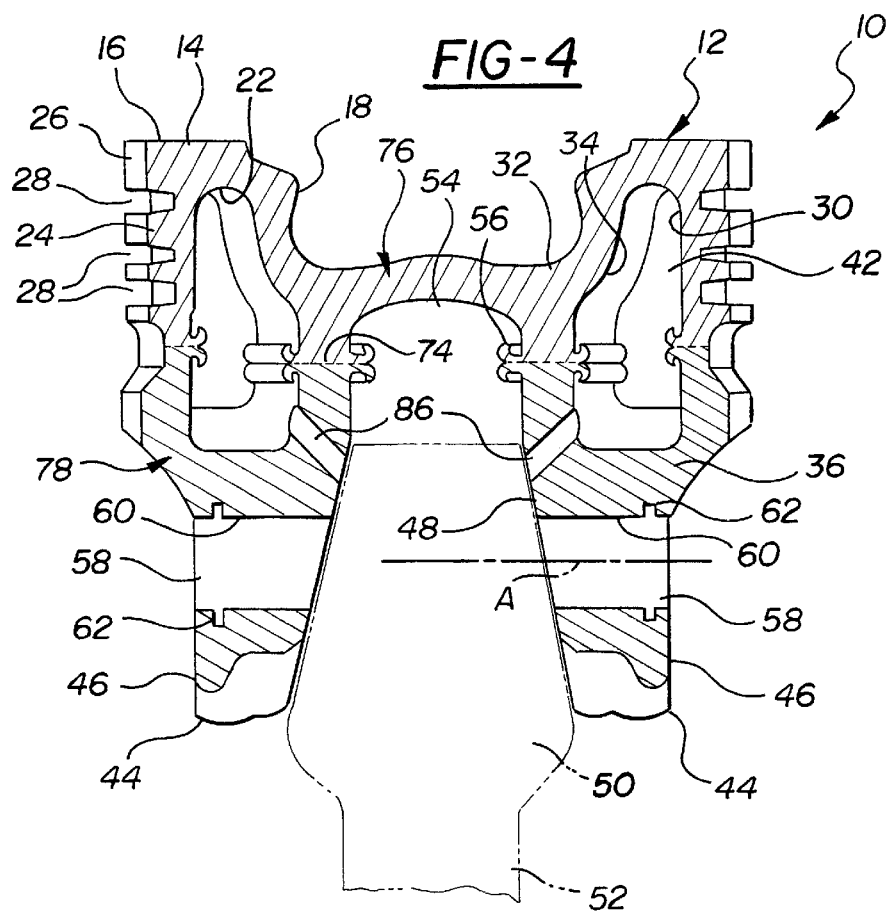
FIG. 4 is a cross-sectional elevation view taken generally along lines 4–4 of FIG. 2, but of the entire piston assembly.

Collectively, the walls 14, 24, 32 and 36 define an interior, annular, ring-like cavity or gallery 42 within the piston body 12 that is closed by the walls. As illustrated in FIGS. 2–4, the gallery 42 extends completely around the piston body 12 and is bounded at the top by the top wall 14, at the bottom by the bottom 36, at the outer periphery by the outer wall 24, and at the inner periphery by the inner wall 32. By "closed" it is meant that the gallery 42 is closed at the bottom by a structural component of the piston body 12, namely the bottom wall 36, which not only extends between but joins the lower ends of the outer wall 24 and inner wall 32. As will be explained further below, various openings and passages are provided to allow cooling oil to circulate into and out of the gallery 42, and thus the term "closed" contemplates the provision of such openings and passages to accommodate the flow of cooling oil through the gallery 42. It will also be appreciated by those skilled in the art that the terms "top", "bottom", "inner" and "outer" in describing the walls are intended and should be construed to represent portions of the surrounding wall structure which enclose the gallery 42 and should not be strictly construed based on the illustrated embodiment shown in the drawings since the particular shape and size of the gallery 42 will likely change from piston to piston depending on the particular cooling requirements necessary for a particular application.

The piston body 12 is further formed with a pair of pin boss portions 44 that are formed and preferably investment cast as one piece with the inner wall 32 and bottom wall 36 from steel. The pin bosses 44 have outer faces 46 that face away from one another and inner faces 48 that face toward one another. The inner faces 48 are each generally planar and preferably divergent toward the bottom of the pin bosses 44, and define a space 50 between the inner faces 48 for accommodating a connecting rod 52 (FIG. 4). A dome or cavity 54 may extend above the space 50, as shown, for cooling the combustion bowl 18. The surfaces which form the cavity 54 extend from, but out of the plane of, the inner faces 48 of the pin bosses 44 and, in the illustrated embodiment, are provided in part by inner surfaces 56 of the inner wall 32. The pin bosses 44 are formed with axially aligned pin bores 58 having pin bore surfaces 60 which are substantially cylindrical and aligned about a pin bore axis A (FIG. 3). The outer and inner faces 46, 48 surround the pin bores 58. The pin bores 58 receive a wrist pin (not shown) which serves to interconnect the piston body 12 with the connection rod 52. The pin bore surfaces 60 provide support to the wrist pin, preferably without the assistance of any bushings, such that the pin bores 58 are preferably bushing-less. Each of the pin bores 58 includes an annular snap ring groove 62 for receiving a snap ring to secure the wrist pin (not shown) within the pin bores 58 in usual manner.

The piston body 12 also includes a piston skirt 64. The piston skirt 64 is preferably cast as a single piece with the pin bosses 44, thus providing a monobloc piston structure rather than an articulated skirt. The skirt could, however, be formed as a separate structural component from the piston body 12 and joined through the wrist pin (not shown) in articulated manner to the pin bosses 44, while retaining the closed gallery structure of the piston body 12, but the monobloc structure is preferred. The piston skirt 64 has an outer surface 66 extending between the pin bosses 44 that is substantially in line and forms a extension of the outer surface 26 of the outer wall 24. The outer surface 66 is interrupted across the pin bores 58 to provide recessed side faces 68 where the skirt 64 joins the pin bosses 44. An inner surface 70 of the piston skirt 64 defines a space 72 adjacent the pin bores 58 that is walled off by the skirt 64.

The closed gallery structure of the piston body 12 is preferably achieved by forming the piston body 12 from at least two separate parts which are subsequently joined across a joint or joints 74 to effectively yield a united, one piece body structure once joined. While there are a number of ways to join such separate components, all of which are contemplated by the invention, the preferred approach is to join the separately formed components across a friction weld joint 74, as illustrated in FIGS. 3 and 4. In such case, a top part 76 above the joint 74 is separately formed from a bottom part 78 on the opposite side of the joint 74, and the separately formed parts 76, 78 are then friction welded together across the joint 74 to yield the united structure as shown in the drawings. Some examples of other joining techniques that are contemplated include other means of welding, bonding, brazing, screw thread joint, and other mechanical and metallurgical means of uniting the separate components together to yield the closed gallery structure of the piston body 12.

According to a further preferred aspect of the invention, at least the bottom part 78 is investment cast from steel, and the top part 76 may likewise be investment cast from steel or formed by other techniques such as forging or other casting techniques.

Referring now particularly to FIGS. 2 and 5–7, the bottom wall 36 of the piston body 12 is formed with at least one and preferably two oil access holes 80 which extend from the lower surface 40 of the bottom wall 36 within the space 72 into the oil gallery 42. The oil holes 80 preferably are entry ports for introducing cooling oil into the gallery 42. When the piston 10 is installed in a diesel engine, the oil holes 80 communicate with associated oil injection nozzles (not shown) which direct a stream of cooling oil from below up into the space 72 and into the gallery 42 through the holes 80. Once in the gallery 42, the cooling oil serves to cool the upper part of the piston body 12, extracting heat from the walls as the oil is moved about in the gallery 42 with a "cocktail shaker" action during reciprocation of the piston 10.

Figure 6:
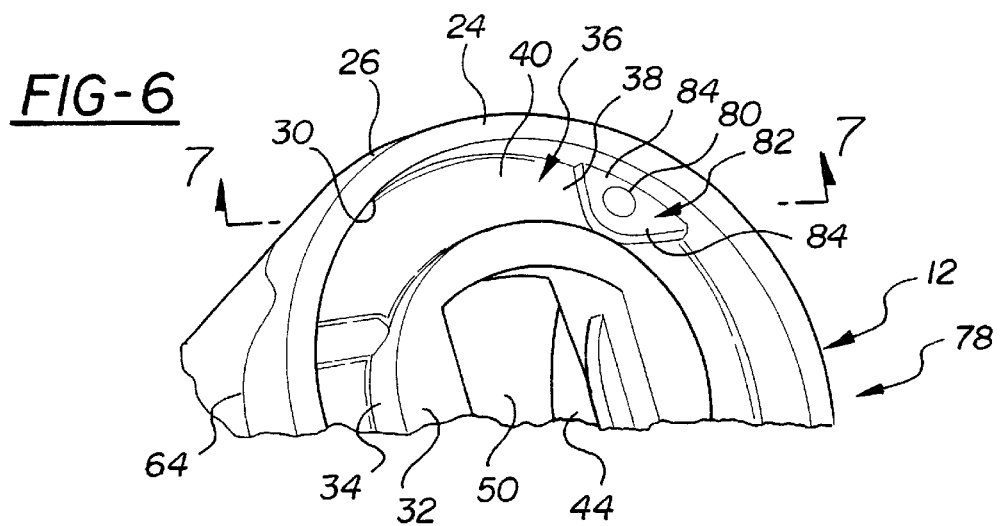
FIG. 6 is a fragmentary top perspective view, with a top portion of the piston removed, as in FIG. 2.
Figure 7:
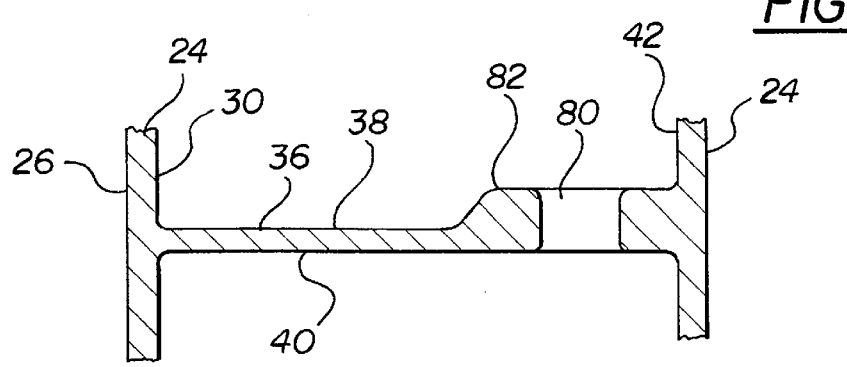
FIG. 7 is a fragmentary cross-sectional view taken generally along lines 7–7 of FIG. 6.

Because of the closed gallery structure of the piston body 12, the combustion forces exerted on the top wall 14 which drive the piston 10 downwardly in the cylinder are transferred to the pin bosses 44 not only through the inner wall 32, but also through the outer wall 24 and interconnecting bottom wall 36. As such, the outer wall 24 and bottom wall 36 serve as structural load-bearing portions of the piston which must withstand the forces of combustion and transfer such loads to the pin bosses 44 without failure. The oil holes 80 and the bottom wall 36 represent an abrupt discontinuity in the bottom wall structure, and thus a potential site for stress concentration and potential failure. The present invention address this problem by reinforcing the piston body structure in the vicinity of the oil holes 80 to counteract the stress concentration effects caused by the introduction of the oil holes 80 in the bottom wall 36. According to the invention, the piston body 12 is formed with oil hole bosses 82 bordering the oil holes 80, which are best shown in FIGS. 2, 6 and 7. The oil hole bosses 82 are defined by localized thickened portions of the bottom wall 36 which immediately border the oil holes 80 in order to give added structural integrity to the bottom wall 36 in the area surrounding the oil holes 80. As illustrated most clearly in FIGS. 6 and 7, the oil hole bosses 82 extend above the upper floor surface 38, such that the thickness of the bottom wall 36 immediately adjacent the oil hole bosses 82 is thinner than that of the portion of the bottom wall 36 making up the oil hole bosses 82. The oil hole bosses 82 preferably extend into and are formed as one piece with the outer wall 24, providing added structural integrity to the transition region between the outer wall 24 and bottom wall 36 in the vicinity of the oil holes 80. It is preferred that all corners of the oil hole bosses 82 are rounded, as illustrated in FIG. 6 and 7 to reduce stress concentration.

As shown best in FIGS. 2 and 6, the oil hole bosses, when viewed from above in plan, have a non-circular shape and preferably include generally triangular regions or portions 84 where the oil hole bosses 82 join the outer wall 24. It will be appreciated that the particular size and shape of the oil hole bosses 82 will be governed in large part by the structure needed to counteract the stress concentration imparted by the presence of the oil holes 80. One advantage of investment casting the bottom part 78 is that the oil hole bosses 82 can be precisely formed to the net or near net shape needed to provide the desired counteracting structure against stress concentration of the holes 80.

Figure 5:
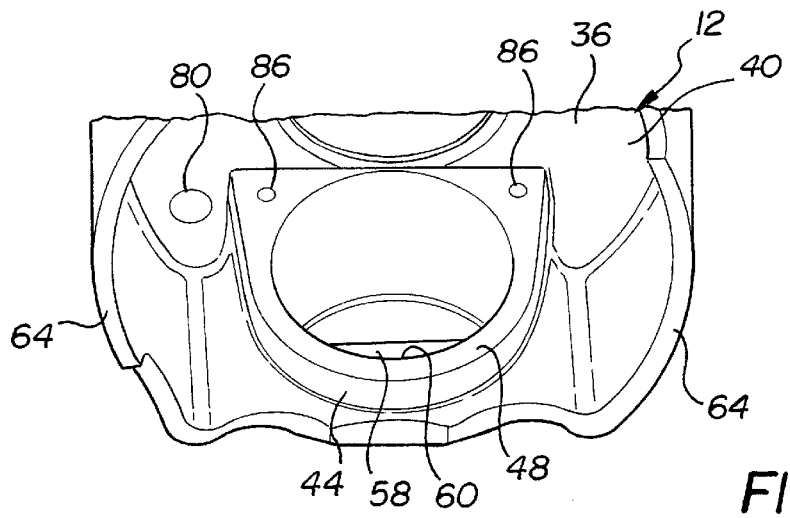
FIG. 5 is a fragmentary bottom perspective view of the piston of FIG. 1.

According to another aspect of the invention, at least one and preferably a pair of passages 86 extend from the gallery 42 directly to the inner faces 48 of the pin bosses 44, so as to provide direct lubrication to the inner faces 48 between the pin bosses 44 and the connection rod 52. The passages 86 are best shown in FIGS. 4 and 5. In the illustrated embodiment, there are thus four such passages 86, two servicing each inner face 48 of the pin bosses 44 on opposite side of the pin bore axis A. The passages 86 are spaced from the walls which form the dome 54 and open directly to the inner faces 48 to provide direct lubrication in the gap between the pin bosses 44 and the connecting rod 52.

According to still a further aspect of the invention and as shown best in FIGS. 1 and 3, the pin bores 58 are formed with an axial recess or pocket 88 which extends axially in the direction of the axis A of the pin bores 58 and presents a discontinuity in the cylindrical pin bore surfaces 60. The recesses 88 are preferably concave and are located at least partly above the center line axis A of the pin bores. The recesses 88 extend axially across the full width of the pin bores 58 and thus are co-extensive with the width of the pin bore surfaces 60 between the outer 46 and inner 48 faces of the pin bosses 44. The recesses 88 are aligned axially with one another and are interrupted by the space 50 between the inner faces 48 of the pin bosses 44, as are the pin bore surfaces 60. The recesses 88 are dome-shaped or concave in cross-section when viewed in the direction of the pin bore axis A. Oil passages 90 extend from the gallery 42 and open directly into each of the recesses 88 so as to feed oil to the recesses 88 during operation of the piston 10 across the full width of the pin bores 58. The oil passages 90 preferably originate from the lowest part of the gallery 42 so as to provide a constant supply of oil to the pin bores 58 during the full cycle of movement of the piston. The entry of each oil passage 90 into its associated recess 88 is preferably about midway between the outer and inner faces 46, 48 of the pin bosses 44 to promote uniform distribution of oil. The recesses 88 serve as reservoirs or holding pockets for oil and continue to feed oil to the pin bore surfaces 60 during the full stroke of the piston 10 to provide full time uniform lubrication.

Obviously, many modifications and variations of the present invention are possible in light of the above teachings. It is, therefore, to be understood that within the scope of the appended claims, the invention may be practiced otherwise than as specifically described. The invention is defined by the claims.

DETAILED DESCRIPTION OF THE PREFERRED EMBODIMENT

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A piston for diesel engines, comprising:

a piston body having an oil gallery;

a pair of pin bosses having pin bores therein disposed about a common pin bore axis and having circumferentially extending pin bore surfaces which are spaced from one another about said circumference by an intervening space between said pin bosses; and at least one recess formed in at least one of said pin bore surfaces extending axially across said at least one pin bore surface and at least one associated oil passage extending from said gallery to said at least one recess for directing oil from said gallery to said at least one said recess.

2. The piston of claim 1 wherein each of said pin bore surfaces includes said at least one of said recess and said at least one associated said oil passage.

3. The piston of claim 2 wherein said recesses of said pin bores are spaced from one another by said space between said pin bosses.

4. The piston of claim 1 wherein said at least one recess is dome-shaped when viewed in the direction of said pin bore axis.

5. The piston of claim 1 wherein said at least one recess extends the full width of said pin bore surfaces.

6. The piston of claim 1 wherein said at least one recess extends at least partially above said pin bore axis.

7. The piston of claim 1 wherein said pin bore surface is bushingless.

8. A piston for diesel engines, comprising:

a piston body having an internal oil gallery;

a pair of pin bosses having pin bores therein aligned along a pin bore axis, said pin bores being separated by a space between said pin bosses extending above said pin bores such that said pin bores have discrete pin bore surfaces that are interrupted from connecting with one another by the intervening space between said pin bosses;

an oil passage leading from said cooling gallery to each of said pin bores; and a recess extending axially across substantially the full width of each of said pin bore surfaces in line with said oil passages such that said oil passages open into said recesses.

\* \* \* \* \*

UNITED STATES PATENT AND TRADEMARK OFFICE
CERTIFICATE OF CORRECTION

PATENT NO.     : 6,513,477 B1
DATED          : February 4, 2003
INVENTOR(S)    : Randall R. Gaiser et al.

It is certified that error appears in the above-identified patent and that said Letters Patent is hereby corrected as shown below:

<u>Title page,</u>
Item [57], ABSTRACT, the Abstract is amended to read as follows:

-- [57]               ABSTRACT

A piston for diesel engines includes a piston body formed with a closed oil gallery and a pair of pin bosses having axially aligned pin bores whose surfaces are spaced from one another about their circumference across an intervening gap between the pin bosses. The pin bore surfaces are each formed with a recess which extends in the axial direction of the pin bores across the full width of each of the pin bore surfaces. An oil passage leads from the gallery to each of the recesses and feeds the recesses with lubricating oil from the gallery. The recesses act as retention basins or reservoirs which collect and supply the pin bore surfaces with lubricating oil during the full cycle of the piston. --

Signed and Sealed this

Twenty-seventh Day of May, 2003

JAMES E. ROGAN
*Director of the United States Patent and Trademark Office*